US011053909B2

(12) United States Patent
Suzuki

(10) Patent No.: US 11,053,909 B2
(45) Date of Patent: Jul. 6, 2021

(54) HYDRAULIC TURBINE SUSPENDING DEVICE

(71) Applicant: NTN CORPORATION, Osaka (JP)

(72) Inventor: Masahiko Suzuki, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/330,780

(22) PCT Filed: Sep. 7, 2017

(86) PCT No.: PCT/JP2017/032382
§ 371 (c)(1),
(2) Date: Mar. 6, 2019

(87) PCT Pub. No.: WO2018/047926
PCT Pub. Date: Mar. 15, 2018

(65) Prior Publication Data
US 2019/0195187 A1    Jun. 27, 2019

(30) Foreign Application Priority Data

Sep. 8, 2016   (JP) ............................... JP2016-175166

(51) Int. Cl.
*F03B 11/00* (2006.01)
*F03B 17/06* (2006.01)
(Continued)

(52) U.S. Cl.
CPC ................ *F03B 11/00* (2013.01); *F03B 7/00* (2013.01); *F03B 17/06* (2013.01); *F03B 17/063* (2013.01);
(Continued)

(58) Field of Classification Search
CPC ............ F03B 11/00; F03B 17/06; Y02E 10/20
(Continued)

(56) References Cited

U.S. PATENT DOCUMENTS 1,034,603 A * 8/1912 Farley ................... F03B 17/066
416/8
1,399,558 A * 12/1921 Howe ................... F03B 17/061
416/10
(Continued)

FOREIGN PATENT DOCUMENTS

| JP | 2007-040217 A | 2/2007 |
| JP | 2007-211651 A | 8/2007 |

(Continued)

OTHER PUBLICATIONS

International Search Report Corresponding to PCT/JP2017/032382 dated Oct. 24, 2017.
(Continued)

*Primary Examiner* — Pedro J Cuevas
(74) *Attorney, Agent, or Firm* — Finch & Maloney, PLLC; Michael J. Bujold

(57) ABSTRACT

A hydraulic turbine suspending device is provided which facilitates the positioning of a hydroelectric generator in a waterway, and which is easy to work on. The hydraulic turbine suspending device is a support that suspends a hydraulic turbine (10) in a waterway by laterally bridging the same, and comprises a combination of a suspending beam (2) positioned in parallel with the upstream and downstream sides of the waterway; a plurality of stanchions (5) that support the edges of the suspending beam (2) in a horizontal position on the outside of the waterway; and a floor plate (6) provided in a tensioned state to the suspending beam (2).

4 Claims, 3 Drawing Sheets

(51) Int. Cl.
*F03B 7/00* (2006.01)
*F03B 13/26* (2006.01)

(52) U.S. Cl.
CPC ......... *F03B 13/264* (2013.01); *F05B 2240/93* (2013.01); *Y02E 10/20* (2013.01)

(58) Field of Classification Search
USPC ..................................................... 290/53, 54
See application file for complete search history.

(56) References Cited

U.S. PATENT DOCUMENTS

| | | | | |
|---|---|---|---|---|
| 1,555,847 A * | 10/1925 | Hudson | ...................... | E04G 7/20 403/306 |
| 2,924,311 A * | 2/1960 | Brown | ................... | E04B 1/5812 403/9 |
| 3,221,466 A * | 12/1965 | Downing, Jr. | ............ | E04B 9/10 52/848 |
| 3,462,021 A * | 8/1969 | Hawke | .................. | F16B 7/0493 211/182 |
| 3,584,904 A * | 6/1971 | Lickliter | ................. | E04B 9/122 403/252 |
| 3,685,863 A * | 8/1972 | Oetiker | ................. | E04B 1/2403 403/286 |
| 3,890,760 A * | 6/1975 | Jones | .................... | F16B 7/0413 403/360 |
| 3,898,784 A * | 8/1975 | Sauer | ........................ | F16B 7/22 403/327 |
| 3,921,363 A * | 11/1975 | Beynon | ................... | E04B 9/122 403/219 |
| 3,928,950 A * | 12/1975 | Beynon | ..................... | E04B 9/10 52/506.07 |
| 3,979,874 A * | 9/1976 | Cubbler, Jr. | .............. | E04B 9/10 52/664 |
| 4,018,020 A * | 4/1977 | Sauer | ........................ | E04B 2/7457 52/241 |
| 4,161,856 A * | 7/1979 | Brown | ...................... | E04B 9/00 52/667 |
| 4,241,283 A * | 12/1980 | Storer, Sr. | ................. | E02B 9/04 290/43 |
| 4,314,432 A * | 2/1982 | Rosenbaum | .............. | E04B 9/10 403/363 |
| 4,317,318 A * | 3/1982 | Sauer | ....................... | E04B 9/122 52/506.06 |
| RE31,201 E * | 4/1983 | Sauer | ....................... | E04B 9/122 52/667 |
| 4,625,124 A * | 11/1986 | Ching-An | ............. | F03B 13/145 290/42 |
| 4,630,550 A * | 12/1986 | Weitzman | ............... | A47B 13/06 108/155 |
| 4,691,818 A * | 9/1987 | Weber | .................... | B65G 33/32 198/666 |
| 4,717,831 A * | 1/1988 | Kikuchi | ................ | F03B 13/184 290/53 |
| 4,738,061 A * | 4/1988 | Herndon | ................. | E02D 27/02 52/126.6 |
| 4,843,249 A * | 6/1989 | Bussiere | ............... | F03B 13/183 290/42 |
| 5,127,760 A * | 7/1992 | Brady | ..................... | E04B 2/825 403/230 |
| 5,347,703 A * | 9/1994 | Imashimizu | .............. | B63B 3/00 29/525.11 |
| 5,440,175 A * | 8/1995 | Mayo, Jr. | ................ | F03B 7/003 290/53 |
| 5,531,464 A * | 7/1996 | Maurer | .................. | B62B 3/00 211/126.15 |
| 5,596,845 A * | 1/1997 | Strizki | ................. | E01F 9/635 403/13 |
| 5,882,143 A * | 3/1999 | Williams, Jr. | ............ | E02B 9/00 290/53 |
| 6,408,587 B2 * | 6/2002 | Cronin | ..................... | E04C 3/04 52/637 |
| 6,534,881 B1 * | 3/2003 | Slavchev | ................ | F03B 17/02 290/53 |
| 6,874,971 B2 * | 4/2005 | Albaugh | ................... | F16B 2/04 403/297 |
| 6,983,569 B1 * | 1/2006 | Rosenberg | ............ | E04B 2/7457 52/241 |
| 7,127,862 B2 * | 10/2006 | Saldana | ................ | E04B 1/2403 52/715 |
| RE39,462 E * | 1/2007 | Brady | ..................... | E04B 2/825 403/230 |
| 7,594,331 B2 * | 9/2009 | Andrews | ................ | E04B 2/761 29/37 R |
| 8,028,494 B2 * | 10/2011 | Denn | ..................... | E04B 1/2403 52/848 |
| 8,786,122 B2 * | 7/2014 | Rajadhyaksha | ....... | F03B 17/063 290/53 |
| 8,863,511 B2 * | 10/2014 | Swamidass | ......... | F03B 13/1815 290/42 |
| 9,103,084 B2 * | 8/2015 | French, Sr. | ................ | E02B 7/04 |
| 9,181,922 B2 * | 11/2015 | Dib Echeverria | .... | F03B 13/186 |
| 9,447,573 B2 * | 9/2016 | Schubert | .................. | E04B 1/24 |
| 9,534,579 B2 * | 1/2017 | Van Rompay | ........ | F03B 17/063 |
| 9,730,431 B2 * | 8/2017 | French | .................... | E02B 8/085 |
| 9,732,725 B2 * | 8/2017 | Bauer | .................... | F03B 17/063 |
| 10,053,833 B2 * | 8/2018 | Baumgartner | ........... | E02D 29/02 |
| 10,267,011 B2 * | 4/2019 | Baumgartner | ...... | E02D 29/0266 |
| 10,281,097 B2 * | 5/2019 | Hsieh | ..................... | F16M 11/28 |
| 10,344,489 B2 * | 7/2019 | Koss | ...................... | E04G 25/02 |
| 10,640,969 B2 * | 5/2020 | Grosch | .................. | E04B 1/1912 |
| 10,641,238 B2 * | 5/2020 | Suzuki | ................. | F03B 17/061 |
| 10,662,917 B2 * | 5/2020 | Suzuki | ................... | F16D 1/027 |
| 10,745,901 B2 * | 8/2020 | Steyl | ..................... | E04B 1/1903 |
| 2003/0041549 A1 * | 3/2003 | Simmons | ............. | E04B 1/2403 52/655.1 |
| 2005/0034408 A1 * | 2/2005 | Palumbo | ............... | E04B 2/7457 52/633 |
| 2006/0277841 A1 * | 12/2006 | Majusiak | .............. | E04B 2/7457 52/105 |
| 2006/0283130 A1 * | 12/2006 | Andrews | ................. | E04B 2/767 52/633 |
| 2012/0007361 A1 * | 1/2012 | Agtuca | ..................... | H02P 9/04 290/43 |
| 2012/0032444 A1 * | 2/2012 | Burton | .................. | F03B 13/145 290/53 |
| 2012/0119499 A1 * | 5/2012 | Kato | ..................... | F03B 17/063 290/52 |
| 2013/0088013 A1 * | 4/2013 | Yan | ....................... | F03B 17/063 290/54 |
| 2013/0266378 A1 * | 10/2013 | French, Sr. | ............... | E02B 7/04 405/78 |
| 2013/0285383 A1 * | 10/2013 | Belarbi | .................. | F03B 17/063 290/54 |
| 2015/0211204 A1 * | 7/2015 | Baumgartner | ...... | E02D 29/0283 405/287 |
| 2015/0267675 A1 * | 9/2015 | Kumano | ................ | F03B 17/065 290/54 |
| 2015/0377414 A1 * | 12/2015 | Pirseyedi | .............. | F16B 7/0466 403/205 |
| 2016/0017558 A1 * | 1/2016 | French, Sr. | ............. | E02B 8/085 405/81 |
| 2016/0237983 A1 * | 8/2016 | Hayman | ................ | F03B 13/264 |
| 2016/0286766 A1 * | 10/2016 | French | ................... | E02B 8/085 |
| 2017/0233996 A1 * | 8/2017 | Abernathy | ............ | F16B 7/0446 52/698 |
| 2017/0370063 A1 * | 12/2017 | French | .................... | E02B 8/085 |
| 2018/0328055 A1 * | 11/2018 | Koss | ...................... | E04G 25/02 |
| 2018/0355576 A1 * | 12/2018 | Baumgartner | ...... | E02D 29/0266 |
| 2019/0101094 A1 * | 4/2019 | Suzuki | .................... | F03B 17/06 |
| 2019/0101097 A1 * | 4/2019 | Suzuki | ................. | F03B 17/061 |
| 2019/0277000 A1 * | 9/2019 | French, Sr. | ......... | A01M 31/002 |
| 2019/0323223 A1 * | 10/2019 | Theriot | ..................... | E04C 3/32 |
| 2019/0330843 A1 * | 10/2019 | Morokutti | ................ | E04B 2/46 |

FOREIGN PATENT DOCUMENTS

| | | |
|---|---|---|
| JP | 2013083173 A | 5/2013 |
| JP | 2015-014219 A | 1/2015 |

(56) References Cited

FOREIGN PATENT DOCUMENTS

| | | |
|---|---|---|
| JP | 2016-061183 A | 4/2016 |
| JP | 2016142187 A | 8/2016 |
| WO | 2009066496 A1 | 5/2009 |

OTHER PUBLICATIONS

Written Opinion Corresponding to PCT/JP2017/032382 dated Oct. 24, 2017.
Supplementary European Search Report issued in corresponding European Patent Application No. 17 84 8864 dated Jan. 24, 2020.
Chinese Office Action issued in corresponding Chinese Patent Application No. 201780055290.1 dated Apr. 28, 2020.

* cited by examiner

HYDRAULIC TURBINE SUSPENDING DEVICE

TECHNICAL FIELD

The present invention relates to a suspension device for disposing a waterwheel in a water channel and relates to a waterwheel suspending device that enables a waterwheel to be easily disposed is a short period of time in any of water channels having different widths.

BACKGROUND OF THE INVENTION

Conventionally, PTL 1 describes an example in which for disposition of waterwheels in a flume, horizontal beams are transversely provided so as to bridge the flume via locking members arranged on upper surfaces of side walls of a water channel to cause the waterwheels to be supported by the horizontal beams.

CITATION LIST

Patent Literature

[PTL 1] JP 2015-14219 A

SUMMARY OF THE INVENTION

Problems to be Solved by the Invention

Where locking members such as described in PTL 1 above are disposed on upper surfaces of side walls of a water channel, since different flumes have different water channel widths, the locking members may fail to be arranged and a length of the horizontal beam needs to be adjusted for each case.

An object of the present invention is to provide a waterwheel suspending device that can be installed in a short period of time regardless of a width of the water channel and is excellent in ease of work and safety.

Means for Solving the Problems

Specific contents of the present invention are as follows.

(1) A waterwheel suspending device that is a suspension support device transversely provided so as to bridge opposite banks of a water channel to suspend a waterwheel, the device comprising a combination of spliceable suspension main bodies arranged in parallel on an upstream side and a downstream side of the water channel, respectively, a plurality of footings for horizontally supporting respective end portions of the suspension main bodies outside the water channel and a floor plate stretched across upper surfaces of the suspension main bodies.

(2) The water wheel suspending device according to (1) above, wherein a holding body including a fitting portion that maintains an end portion of the relevant suspension main body horizontally is provided on an upper surface of each of the footings.

(3) The waterwheel suspending device according to (1) or (2) above, wherein a mount portion for fixing a relevant holding body is formed on an anchor portion of each of the footings.

(4) The waterwheel suspending device according to any of (1) to (3) above, wherein each of the footings includes a threaded rod provided in an upright manner in an upper surface of a relevant mount portion.

(5) The waterwheel suspending device according to any of (1) to (4) above, wherein each of the suspension main bodies is configured so that a plurality of suspension main bodies can be joined in series via a joining element.

Advantages of the Invention

The present invention provides the following advantages.

Since the invention stated in (1) above includes a combination of spliceable suspension main bodies, footings and a floor plate, a waterwheel can easily be disposed in a short period of time in a flume in any geographical condition by merely digging foundation holes in the ground besides a water channel, installing the footings, fixing extremity portions of the suspension main bodies to the footings to cause the suspension main bodies to be transversely provided so as to bridge the footings and stretching the floor plate over the suspension main bodies.

In the invention according to (2) above, a holding body including a fitting portion that maintains an end portion of the relevant suspension main body horizontally is provided in an upper surface of each of the footings, and thus, the extremity portions of the suspension main bodies can easily and firmly be fixed to the holding bodies by fitting the extremity portions of the suspension main bodies in the holding bodies.

In the invention according to (3) above, a mount portion for fixing a relevant holding body is formed on an anchor portion of each of the footings, the suspension main bodies can firmly be fixed by burying the anchor portions in the ground and fixing the holding bodies to exposed upper surfaces of the mount portions.

In the invention according to (4) above, each of the footings includes a threaded bolt provided in an upright manner in an upper surface of a relevant mount portion, and thus, the holding bodies can firmly be fixed by the threaded bolts.

In the invention according to (5) above, each of the suspension main bodies is configured so that a plurality of suspension main bodies can be joined in series via a joining element, and thus, where the flume has a wide width, suspension main bodies can be joined via a joining element according to the width of the flume and thus can easily be installed.

DESCRIPTION OF EMBODIMENTS

Figure 1:
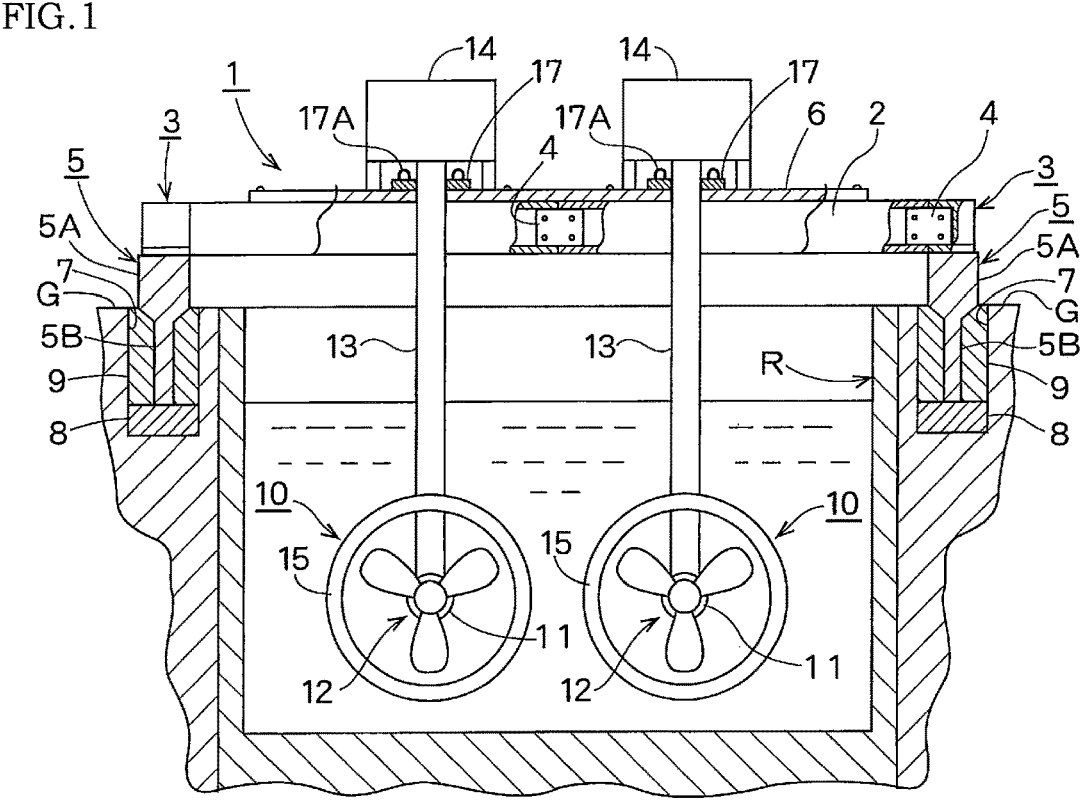
FIG. 1 is a vertical front sectional view of an embodiment of the present invention.
Figure 2:
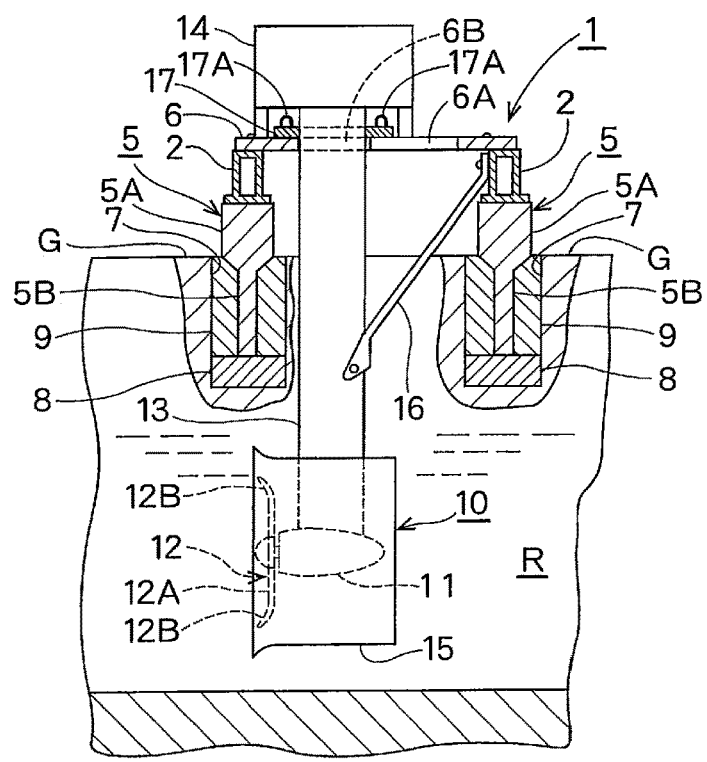
FIG. 2 is a side view of FIG. 1 with some parts cut out.

Embodiments of the present invention will be described with reference to the drawings. FIG. 1 is a front view of a waterwheel suspending device 1 of the present invention transversely provided so as to bridge a flume R to suspend waterwheels. FIG. 2 is a side view of the waterwheel suspending device 1 with some parts cut.

The waterwheel suspending device 1 includes a plurality of suspension main bodies 2, holding bodies 3 each fixedly supporting an extremity of the relevant suspension main body 2 at a relevant side of the flume R, footings 5 disposed on opposite banks of the water channel, each of the footings 5 fixedly supporting the relevant holding body 3 at an upper surface thereof, joining elements 4 each joining the relevant suspension main body 2 and the relevant holding body 3, and a floor plate 6 stretched across upper surfaces of the suspension main bodies 2.

Figure 3:
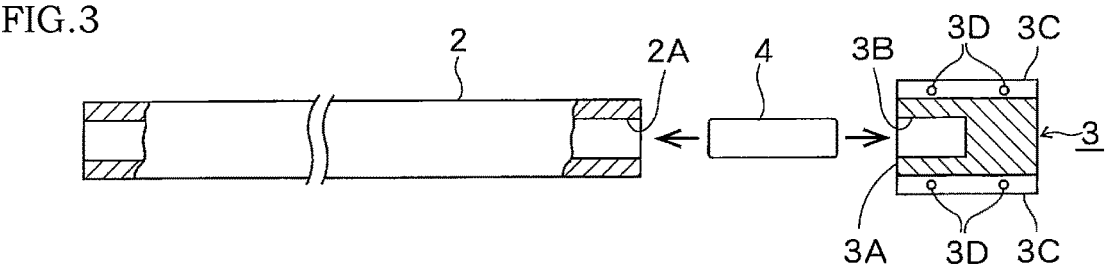
FIG. 3 is a plan view of a suspension main body and a holding body in FIG. 1.
Figure 4:
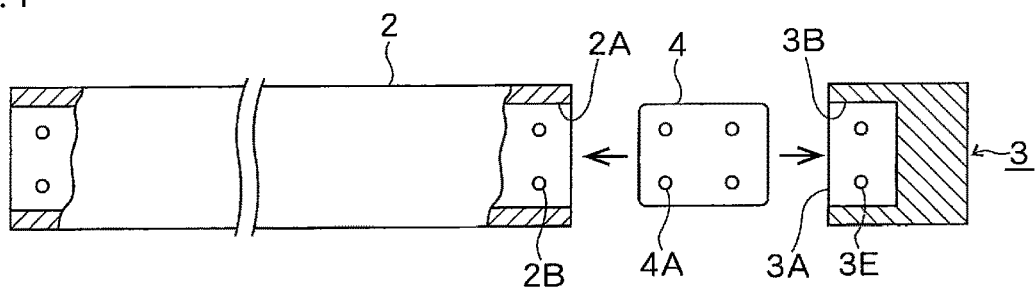
FIG. 4 is a front view of a suspension main body and a holding body in FIG. 1.

FIG. 3 is a plan view of the suspension main body 2 and the holding body 3 with some parts cut out and FIG. 4 is a front view of the same. The suspension main body 2 is, for example, a pipe body having a rectangular sectional shape that is 10 cm wide and 20 cm high and have a length of, for example, 1 m, and a plurality of suspension main bodies 2 can foe joined in series via a joining element 4. Also, non-illustrated screw holes for fixing the floor plate 6 are provided in the upper surface of the suspension main body 2. For enhancement in durability, for example, an FRP protection layer is formed on surfaces of the suspension main body 2.

The joining element 4 is a rectangular block having a size that allows the joining element 4 to be fitted in a pipe hole 2A of the suspension main body 2 and a fitting portion 3A of the holding body 3, and bolt holes 4A corresponding to bolt holes 2B in an end portion of the suspension main body 2 and bolt holes 3E of the holding body 3 are provided in the joining element 4.

Figure 5:
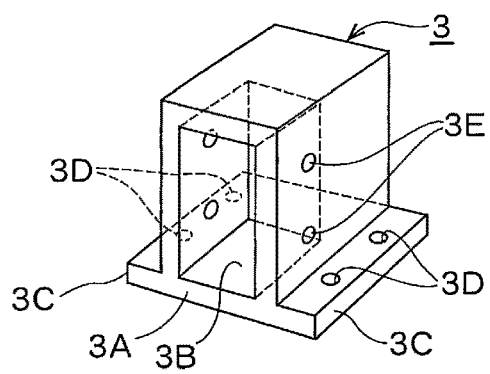
FIG. 5 is a perspective view of a holding body in FIG. 1.

FIG. 5 is a perspective view of the holding body 3. On an upper surface of a base 3A, horizontal flanges 3C, 3C are provided in a projecting manner in the front and the rear of a lower portion of a cube including a fitting portion 3B formed in a side surface of one side. Bolt holes 3D and 3E are provided through front and rear walls of the fitting portion 3B and in the flanges 3C, respectively.

Figure 6:
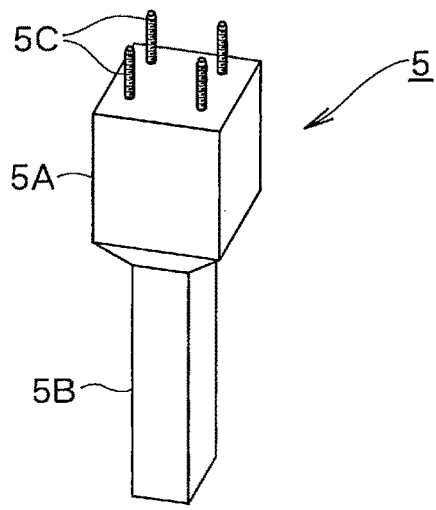
FIG. 6 is a perspective view of a footing in FIG. 1.

The footing 5 illustrated in FIG. 6 includes an elongated anchor portion 5B provided in a descending manner on an area on the central side of a lower surface of a cuboidal mount portion 5A including an upper surface having a dimension that is slightly larger than a lower surface of the holding body 3, and is formed of cement concrete and includes non-illustrated reinforcing steel bars buried therein.

In the upper surface of the mount portion 5A, threaded rods 5C, 5C to be fitted in bolt holes 3D in the flanges 3C of the holding body 3 are disposed, and the bolt holes 3D in the flanges 3C of the holding body 3 are fitted to the threaded rods 5C and fastened to the threaded rods 5C via nuts.

Where the flume R has a wide width, the plurality of suspension main bodies 2 can be joined via the joining element 4. In FIG. 1, two suspension main bodies 2, 2 are joined via the joining element 4.

The waterwheel suspending device 1 formed as described above can easily be constructed at any of flumes R having different widths under any of different geographical conditions. A method for constructing the waterwheel suspending device 1 will be described below.

As illustrated in FIG. 1, at a site at which waterwheel devices 10 are intended to be installed, a length of the suspension main bodies 2 is determined so as to be suited to a width of a flume R, and positions at which holding bodies 3 to which end portions of the suspension main bodies 2 are fixed are determined and a foundation hole 7 that is 20 cm in diameter and 30 cm deep is dug in ground G of the site.

A bottom of the foundation hole 7 is tamped down and a cement slurry is poured onto the bottoms so as to have thickness of, for example, around 10 cm to form concrete bottom slab 8. In this case, a hard concrete block prepared in advance may be provided.

Next, the anchor portion 5B of the footing 5 is inserted to, and positioned in, the foundation hole 7, a cement fluid is poured around the anchor portion 5B in the foundation hole 7 with an upper surface of the footing 5 kept horizontally and then is cured into a concrete base 9. Work similar to the above is performed on ground G of the opposite band.

In this case, where the flume R has a narrow width, as illustrated in FIG. 1, a procedure in which the plurality of suspension main bodies 2, 2 are joined, each of opposite ends of the joined suspension main bodies 2, 2 are fixed to the holding bodies 3, 3, the anchor portions 5B, 5B of the footings 5, 5 are inserted to the respective foundation holes 7, 7 with the footings 5, 5 fixed to bottoms of the holding bodies 3, 3 and concrete is then poured may be employed.

Figure 7:
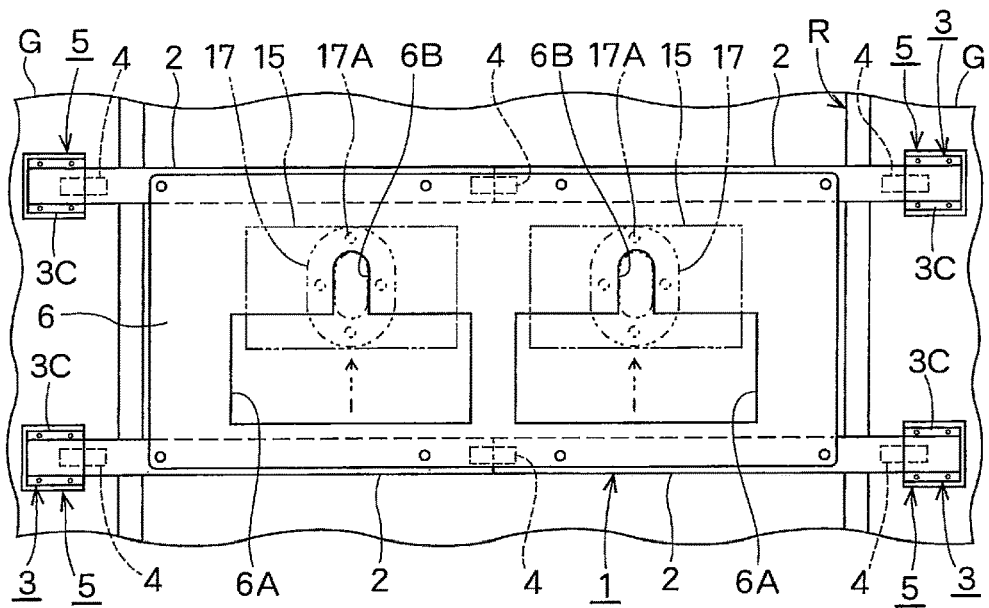
FIG. 7 is a plan view of the waterwheel suspending device in FIG. 1 transversely provided so as to bridge a water channel.

FIG. 7 is a plan view of the waterwheel suspending device 1 in a state in which the waterwheel suspending device 1 is transversely provided so as to bridge the flume R. Two suspension main bodies 2 are arranged in parallel on the upstream side and the downstream side, respectively. A space between the suspension main bodies 2 arrange in parallel is set so as to be suited to a size of the waterwheel devices 10 to be installed.

Where the waterwheel devices 10 to be suspended are large in size, three or more suspension main bodies 2 can be arranged in parallel to respond to such case.

The floor plate 6 is screw-fastened to the upper surfaces of the suspension main bodies 2. The floor plate 6 may be formed of an arbitrary material such as metal, synthetic resin or wood as long as floor plate 6 can support the waterwheel devices 10. In the downstream side of the floor plate 6, installation holes 6A having a size that enables the waterwheel devices 10 to be inserted into and pulled out therfrom are provided and in the upstream side of the same, holding holes 6B holding suspension pipes 13 for the waterwheel devices 10 are provided.

Although the waterwheel devices 10 illustrated in FIGS. 1 and 2 are mere examples, a rotor 12 is fixedly provided at a distal end of a non-illustrated rotor shaft supported inside each waterwheel casing 11. A suspension pipe 13 is fixed to an upper portion of each waterwheel casing 11 and a power generator 14 is disposed at an upper end of the suspension pipe 13.

A non-illustrated transmission shaft disposed inside each suspension pipe 13 is joined to the rotor shaft and a rotary shaft of the power generator 14. A duct 15 is disposed so as to surround each waterwheel casing 11.

An inclined portion 12B inclined in the upstream direction is formed at an edge of each lift-type blade 12A of each rotor 12.

The inclined portion 12B is configured so as to, upon rotation, receive a water flow of water hitting the lift-type blades 12A and thereby scattered in a centrifugal direction to enhance a torque.

Each duct 15 is fixed to a lower end portion of each suspension pipe 13, and inside the duct 15, the relevant waterwheel casing 11 is safely and firmly fixed and a flow speed inside is enhanced.

A non-illustrated horizontal sectional shape of each suspension pipe 13 is a fish-like shape in which a front portion is thick and a rear portion is thinner. A plate-like suspension lock fitting 17 is fixed to a position in an upper position in each suspension pipe 13 at which the suspension pipe 13 is in contact with an upper surface of the floor plate 6. Each suspension lock fitting 17 is suspended on, screw-fastened and thereby fixed to a part around the relevant holding hole 6B of the floor plate 6.

Hooks 17A that hold a towing cable when the relevant waterwheel 10 is lifted up/down 17A are provided at an upper surface of each suspension lock fitting 17. Also, a slanted support rod 16 for preventing shaking of the relevant waterwheel casing 11 is fixed between a rear portion of each relevant suspension pipe 13 and a front surface of the relevant suspension main body 2 on the downstream side of the waterwheel suspending device 1. After the waterwheel devices 10 are disposed in the waterwheel suspending device 1, the power generators 14 are connected to the respective upper ends of the suspension pipes 13.

Figure 8:
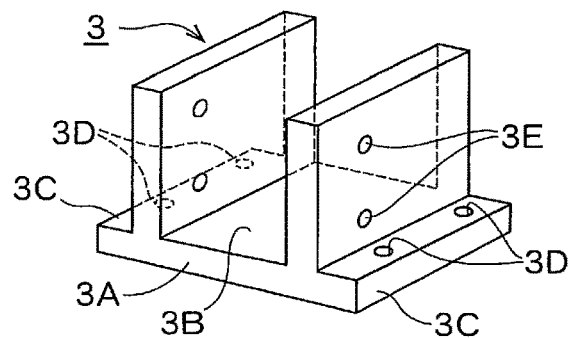
FIG. 8 is a perspective view of a holding body according to a second embodiment.

FIG. 8 is a perspective view illustrating another embodiment of a holding body 3. Parts that are the same as those of the preceding embodiment are provided with symbols that are the same as those of the preceding embodiment and description thereof will be omitted. The holding body 3 in embodiment 2 includes a groove-like fitting portion 3B in which an extremity portion of a suspension main body 2 is to be inserted from above, and thus even if the suspension main body 2 is relatively long, the suspension main body 2 can be fitted and fixed in the fitting portion 3B.

Figure 9:
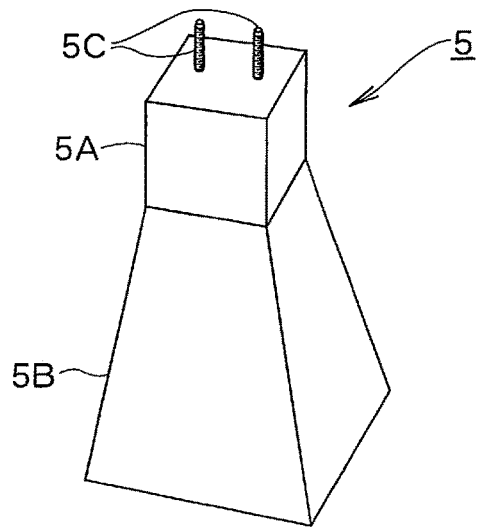
FIG. 9 is a perspective view of a footing according to the second embodiment.

FIG. 9 is a perspective view illustrating another embodiment of a footing. Parts that are the same as those of the preceding embodiment are provided with symbols that are the same as those of the preceding embodiment and description thereof will be omitted. The footing 5 in this embodiment includes a lower portion of an anchor portion 5B, the lower portion being formed so as to be larger than an upper portion, and thus is favorable in stability. The footing 5 includes non-illustrated reinforcing steel bars buried inside and thus have high rigidity.

As described above, it is only necessary to form a concrete bottom slab 8 on the bottom of each foundation hole 7, dispose a footing 5 on the concrete bottom slab 8 and put soil back into the foundation hole 7 to fill the foundation hole 7, which is excellent in ease of work.

The holding body 3 or an end portion of the suspension main body 2 can directly be fixed to threaded rods 5C in the upper surface.

Although the suspension main bodies 2 having a pipe-like shape are shown, the shape of the suspension main bodies 2 in the present invention is not limited to this shape, and, for example, an H-shaped steel material or a steel material having any of other arbitrary shape can be used, and a joining element of an outer-fitting type, the joining element having a shape conforming to a sectional shape of the steel material, is selected.

INDUSTRIAL APPLICABILITY

In a waterwheel suspending frame device of the present invention, a combination of necessary members is included and a length of a suspension main body can be adjusted, and thus, the waterwheel suspending device can easily be provided so as to bridge a water channel even at any of sites having different water channel widths and thus is excellent in ease of work and can effectively be used in installation of a hydropower generator in, e.g., a flume.

DESCRIPTION OF SYMBOLS

1: waterwheel suspending frame device
2: suspension main body
2A: pipe hole
2B: bolt hole
3: holding body
3A: base
3B: fitting portion
3C, flange
3D, 3E: bolt hole
4: joining element
4A: bolt hole
5: footing
5A: mount portion
5B: anchor portion
5C: threaded rod
6: floor plate
6A: installation hole
6B: holding hole
7: foundation hole
8: bottom slab
9: concrete base
10: waterwheel device
11: waterwheel casing
12: rotor
12A: lift-type blade
12B: inclined portion
13: suspension pipe
14: power generator
15: duct
16: slanted support rod
17: suspension lock fitting
G: ground
R: water channel

The invention claimed is:

1. A waterwheel suspending device that is a support device which is transversely provided so as to bridge a water channel to suspend a waterwheel, the device comprising:
   a combination of a plurality of spliceable suspension main bodies joined in a pipe hole of the suspension main body via a joining element having a rectangle block shape and arranged in parallel on an upstream side and a downstream side of the water channel, respectively, so as to be able to suspend the waterwheel regardless of a width of the water channel,
   a holding body which includes a fitting portion that is fitted in a state of actual direct contact with the joining element and has a recess that is not penetrated in order to maintain an end portion of the relevant suspension main body horizontally,
   a plurality of footings for horizontally supporting the respective holding bodies outside the water channel, and
   a floor plate stretched across upper surfaces of the suspension main bodies.

2. The waterwheel suspending device according to claim 1, wherein a mount portion for fixing the relevant holding body is formed on an anchor portion of each of the footings.

3. The waterwheel suspending device according to claim 1, wherein each of the footings includes a threaded rod provided in an upright manner in an upper surface of the relevant mount portion.

4. The waterwheel suspending device according to claim 2, wherein each of the footings includes a threaded rod provided in an upright manner in an upper surface of the relevant mount portion.

* * * * *